United States Patent
Fujimaki et al.

(10) Patent No.: US 9,385,398 B2
(45) Date of Patent: Jul. 5, 2016

(54) METHOD FOR MANUFACTURING LITHIUM SECONDARY BATTERY

(75) Inventors: Hisataka Fujimaki, Nisshin (JP); Shinya Kamada, Toyota (JP); Shinya Kuroki, Toyota (JP); Hideto Mori, Toyota (JP); Hisanao Kojima, Kariya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 302 days.

(21) Appl. No.: 14/343,173

(22) PCT Filed: Sep. 8, 2011

(86) PCT No.: PCT/JP2011/070511
§ 371 (c)(1),
(2), (4) Date: Mar. 6, 2014

(87) PCT Pub. No.: WO2013/035187
PCT Pub. Date: Mar. 14, 2013

(65) Prior Publication Data
US 2015/0064566 A1    Mar. 5, 2015

(51) Int. Cl.
*H01M 4/58* (2010.01)
*H01M 10/0525* (2010.01)
(Continued)

(52) U.S. Cl.
CPC .......... *H01M 10/0525* (2013.01); *H01M 4/505* (2013.01); *H01M 4/525* (2013.01);
(Continued)

(58) Field of Classification Search
CPC .......... H01M 10/0525; H01M 10/052; H01M 10/058; H01M 10/446; H01M 10/44; H01M 4/505; H01M 4/525; H01M 2220/20; Y02E 60/122; Y10T 29/49108; Y02T 10/7011
See application file for complete search history.

(56) References Cited

U.S. PATENT DOCUMENTS

| | | | |
|---|---|---|---|
| 2010/0156357 A1* | 6/2010 | Hamad | H02J 7/0093 320/157 |
| 2010/0185405 A1* | 7/2010 | Aoshima | B60L 3/0046 702/63 |

(Continued)

FOREIGN PATENT DOCUMENTS

| | | |
|---|---|---|
| JP | 2005-243537 | 9/2005 |
| JP | 2006-269245 | 10/2006 |

(Continued)

*Primary Examiner* — Raymond Alejandro
(74) *Attorney, Agent, or Firm* — Finnegan, Henderson, Farabow, Garrett & Dunner, LLP

(57) ABSTRACT

Provided is a method for manufacturing a lithium secondary battery which is capable of preventing a local deposition of a metallic foreign substance at a negative electrode regardless of the type of a positive electrode and in which a short-circuit is less likely to occur. The present manufacturing method comprises: a step of assembling a cell that includes a positive electrode, a negative electrode, and a nonaqueous electrolyte; a micro charging step of performing a micro charge on the assembled cell before performing an initial conditioning charge until a positive electrode potential with respect to a metal lithium (Li) reference electrode exceeds an Me dissolution potential set in advance at which a mixing-anticipated metal species (Me) starts to dissolve; and an Me dissolution potential holding step of holding the positive electrode potential of the cell at or above the Me dissolution potential for a prescribed period of time after the micro charge.

12 Claims, 9 Drawing Sheets

(51) Int. Cl.

| | | |
|---|---|---|
| *H01M 4/505* | (2010.01) | |
| *H01M 4/525* | (2010.01) | |
| *H01M 10/058* | (2010.01) | |
| *H01M 10/44* | (2006.01) | |
| *H01M 10/052* | (2010.01) | |

(52) U.S. Cl.
CPC ......... *H01M 10/052* (2013.01); *H01M 10/058* (2013.01); *H01M 10/44* (2013.01); *H01M 10/446* (2013.01); *H01M 2220/20* (2013.01); *Y02E 60/122* (2013.01); *Y02T 10/7011* (2013.01); *Y10T 29/49108* (2015.01)

(56) References Cited

U.S. PATENT DOCUMENTS

2010/0283427 A1\* 11/2010 Sugiyama ............ H01M 16/00
                                                         320/118
2011/0175573 A1\* 7/2011 Ueki ..................... H01M 10/44
                                                         320/116

FOREIGN PATENT DOCUMENTS

| JP | 2007-18963 | 1/2007 |
| JP | 2007-42486 | 2/2007 |
| WO | WO 2012/081128 A1 | 6/2012 |

\* cited by examiner

METHOD FOR MANUFACTURING LITHIUM SECONDARY BATTERY

CROSS-REFERENCE TO RELATED APPLICATIONS

This application is a national phase application of International Application No. PCT/JP2011/070511, filed Sep. 8, 2011, the content of which is incorporated herein by reference.

TECHNICAL FIELD

The present invention relates to a method for manufacturing a lithium secondary battery.

BACKGROUND ART

Conventionally, lithium secondary batteries (typically, lithium-ion batteries) have been utilized as high-performance secondary batteries. A lithium secondary battery comprises a positive electrode including a positive electrode active material made of a lithium-containing complex oxide, a negative electrode including a negative electrode active material capable of storing and releasing lithium ions, a separator interposed between the positive electrode and the negative electrode, and a nonaqueous electrolyte that impregnates the positive electrode, the negative electrode, and the separator. When manufacturing the lithium secondary battery, the positive electrode, the negative electrode, and the separator are assembled and impregnated with the nonaqueous electrolyte, and charging is subsequently performed.

When the lithium secondary battery is being manufactured, a metallic foreign substance (contaminant) such as iron (Fe) or copper (Cu) may be conceivably mixed in from the outside. When such a metallic foreign substance is dissolved in the nonaqueous electrolyte during a charge and is deposited in a concentrated manner on the negative electrode, there is a risk that the deposit may break through the separator to reach the positive electrode and cause a short-circuit. In consideration thereof, conventionally, various techniques have been proposed in order to prevent short-circuits attributable to metallic foreign substances.

Patent Literature 1 describes stabilizing battery characteristics by injecting an electrolytic solution into a battery, performing initial charge and discharge at an alternating current with a frequency of 1 Hz or higher and 1000 Hz or lower, and providing a standing time of 1 hour or more and 48 hours or less after the initial charge and discharge. With the technique disclosed in Patent Literature 1, by repetitively applying such an AC voltage, metal that is mixed in as a foreign substance on the positive electrode when the voltage rises is dissolved into the electrolytic solution. In addition, when the voltage drops, a negative electrode potential is held at or above a dissolution potential of the metal and metal ions are diffused within the electrolytic solution without being deposited on the negative electrode. By providing the standing time, ions created by the dissolution spread over a wide area, and even if the ions are deposited on a surface of the negative electrode, the ions are not concentrated at one location.

Patent Literature 2 describes performing a charge of 1 hour at least once, subsequently performing a discharge until potential of a negative electrode reaches 2.0 V or higher and 3.35 V or lower with respect to an oxidation-reduction potential of lithium, and providing a standing time of 3 minutes or more in this state.

Patent Literature 3 describes charging to 0.01% to 0.1% of a battery capacity for an initial charge and subsequently providing a standing time of 1 to 48 hours.

CITATION LIST

Patent Literature

Patent Literature 1: Japanese Patent Application Laid-open No. 2007-042486
Patent Literature 2: Japanese Patent Application Laid-open No. 2006-269245
Patent Literature 3: Japanese Patent Application Laid-open No. 2005-243537

SUMMARY OF INVENTION

Technical Problem

The proposals disclosed in Patent Literature 1 to 3 are conceivably suitably applicable to, for example, a positive electrode which includes a lithium-nickel complex oxide (typically, $LiNiO_2$) with high capacity retention as an active material. However, when using a positive electrode which has a high capacity but whose capacity retention is slightly lower than a lithium-nickel complex oxide or the like such as a positive electrode including a ternary lithium-containing complex oxide which is made up of cobalt, nickel, and manganese and which is recently garnering attention or the like (hereinafter, sometimes simply referred to as a ternary positive electrode), there is a significant drop in positive electrode potential when allowed to stand during a micro charge. Accordingly, the techniques described above cannot be applied without modification.

For example, according to the technique described in Patent Literature 1, charge and discharge are not performed during the standing time that ranges from 1 hour to 48 hours. Therefore, when using an electrode material such as a ternary positive electrode whose capacity retention is slightly lower than that of a lithium-nickel complex oxide or the like, there is a risk that a significant drop in positive electrode potential occurs when allowed to stand during a micro charge and a dissolution potential of a metallic foreign substance (in particular, 3.2 V or higher for Cu) cannot be held. In this case, if the positive electrode potential drops below the dissolution potential of the metallic foreign substance, since a dissolution reaction of the metallic foreign substance from the positive electrode stops midway, a diffusion effect of the dissolved metal ions is not produced and the metal ions end up being deposited on the surface of the negative electrode.

The technique described in Patent Literature 2 is for performing a charge and discharge and allowing to stand after an extended charge period, and it is anticipated that a rise in negative electrode potential due to the discharge results in a diffusion of dissolved metal ions and prevents the metal ions from being deposited on the negative electrode in a concentrated manner. However, there is a risk that deposition may occur at the negative electrode during the long charge period before the discharge and that the deposit may grow.

The technique described in Patent Literature 3 involves a prolonged standing time after a micro charge. However, since the negative electrode potential declines during the charge and a prolonged standing time in that state is provided, there is a risk that deposition may occur at the negative electrode and that the deposit may grow.

The present invention has been made in order to solve such conventional problems as those described above, and an object thereof is to provide a method for manufacturing a lithium secondary battery capable of preventing a local deposition of a metallic foreign substance at a negative electrode regardless of the type of a positive electrode. Another object of the present invention is to provide a highly-reliable lithium secondary battery in which a short-circuit is less likely to occur and which is obtained by this manufacturing method.

Solution to Problem

The present invention provides a method for manufacturing a lithium secondary battery comprising a positive electrode including a positive electrode active material made of a lithium-containing complex oxide, a negative electrode including a negative electrode active material capable of storing and releasing lithium ions, and a nonaqueous electrolyte. The manufacturing method comprises the following steps.
(1) A step of assembling a cell that includes the positive electrode, the negative electrode, and the nonaqueous electrolyte.
(2) A micro charging step of performing a micro charge on the assembled cell before performing an initial conditioning charge until a positive electrode potential with respect to a metal lithium (Li) reference electrode exceeds an Me dissolution potential set in advance at which a mixing-anticipated metal species (Me) starts to dissolve. Typically, a micro charge with a charge time of 10 seconds or less (suitably, 5 seconds or less) is performed.
(3) An Me dissolution potential holding step of holding the positive electrode potential of the cell at or above the Me dissolution potential for a prescribed period of time after the micro charge.

In the present specification, a "lithium secondary battery" generally refers to a battery which has lithium ions as charge carriers and which are repetitively chargeable, and typically includes a lithium-ion battery, a lithium polymer battery, and the like.

In addition, in the present specification, an "active material" refers to a substance capable of reversibly storing and releasing (typically, inserting and desorbing) a chemical species which acts as a charge carrier in a secondary battery (for example, lithium ions in the case of a lithium-ion battery).

According to this method, first, (1) in the step of assembling a cell, a positive electrode, a negative electrode, a nonaqueous electrolyte, and the like are assembled to construct the cell. Next, (2) in the micro charging step, a micro charge is performed on the assembled cell before performing an initial conditioning charge.

In the micro charging step, a metal species (Me) that is a mixing-anticipated metal or the like having a highest dissolution potential among metal species that are anticipated to be mixed into the positive electrode or the like is anticipated, and an Me dissolution potential at which the metal species (Me) starts to dissolve is set in advance. Subsequently, a micro charge is performed only for a short charge time that is typically 10 seconds or less until a positive electrode potential of the cell with respect to a metal lithium (Li) reference electrode exceeds the Me dissolution potential.

In this case, a mixing-anticipated metal species (Me) is a metal species which has a highest dissolution potential among metallic foreign substances that are anticipated to be mixed in a manufacturing process of a lithium secondary battery and which has an oxidation-reduction potential within an operating voltage range of the lithium secondary battery and is likely to become ions (likely to dissolve). With the manufacturing method disclosed herein, metals that are not likely to become ions (likely to dissolve) within an operating voltage range of the lithium secondary battery need not be considered as the mixing-anticipated metal species (Me) even if the metals are anticipated to be mixed into the positive electrode or the like.

According to such a micro charge, since a highest reachable potential of the positive electrode exceeds the Me dissolution potential at which the mixing-anticipated metal species (Me) starts to dissolve, the mixing-anticipated metal that is mixed into the positive electrode dissolves and migrates toward the side of the negative electrode as metal ions. Since a diffusion rate of metal ions is relatively slow, when a charge is continued for a long period of time by a conventional method, there is a risk that the metal ions may reach the negative electrode and become locally deposited on the negative electrode. However, according to the manufacturing method disclosed herein, since the charge time for the micro charge can be set extremely short (for example, to 10 seconds or less), metal ions can be prevented from reaching and being deposited on the negative electrode within the charge time.

Moreover, the Me dissolution potential of a mixing-anticipated metal species (Me) care be considered equivalent to an oxidation-reduction potential (with respect to Li) of the metal species. However, depending on the construction of a battery or the like, there may be cases where an actual Me dissolution potential exceeds the oxidation-reduction potential of the metal species, in such cases, the Me dissolution potential can be set to an actual Me dissolution potential having a value that is, for example, higher than the oxidation-reduction potential of the metal species.

Furthermore, (3) in the Me dissolution potential holding step, the potential of the positive electrode is held at or above the Me dissolution potential for a prescribed period of time. Accordingly, even when there is mixing of a mixing-anticipated metal species that is mixed on a surface of the positive electrode or the like as well as other metal species (metal species with a lower dissolution potential than the mixing-anticipated metal species; hereinafter, these metal species and the mixing-anticipated metal species may also be collectively referred to as "dissolution object metal species"), since the potential of the positive electrode is held at or above the Me dissolution potential, dissolution (ionization) of the melting object metal species can be achieved. In addition, since the micro charge need only be performed for a period of time (for example, 10 seconds or less and favorably 5 seconds or less) that is significantly shorter than a normal charge time and the potential of the negative electrode can be held at a relatively high level, metal ions made of the dissolution object metal species can be prevented from being reduced and deposited in a concentrated manner in a specific negative electrode surface region. Therefore, metal ions made of the dissolution object metal species are deposited in an diffused state on the negative electrode instead of being locally deposited. Accordingly, the mixing of a metallic foreign substance (a dissolution object metal species such as a mixing-anticipated metal species) no longer causes a short-circuit and can be rendered harmless.

According to a favorable aspect of the manufacturing method disclosed herein, the micro charge is performed so that an amount of charge of the micro charge is less than 0.01% of a capacity of the cell. By regulating the amount of charge to a low level in this manner, a micro charge of a short period of time (for example, a charge time of 10 seconds or less) can be readily achieved.

According to a favorable aspect of the manufacturing method disclosed herein, in the Me dissolution potential holding step, the micro charging step is repeated once or twice or more within the prescribed period of time in order to hold the positive electrode potential of the cell at or above the Me dissolution potential. In other words, by performing the micro charge before the positive electrode potential of the cell drops below the Me dissolution potential, the positive electrode potential of the cell is raised above the Me dissolution potential.

So far, various improvements have been made to lithium secondary batteries in order to improve battery performance. Examples of such improvements include modifications to the materials and compositions of the respective active materials of the positive electrode and the negative electrode, granulation and surface coating of the negative electrode active material, modifications and additions of additives such as an electrically conductive material or a dispersant. Such modifications cause a significant difference in the potential behavior of the positive electrode. Therefore, future means for rendering a metallic foreign substance harmless in a lithium secondary battery may enable various positive electrode potential behavior to be actively controlled. In the manufacturing method disclosed herein, as described above, an amount of charge by one micro charge may be set to an extremely small proportion of the capacity of the cell (for example, as described above, around less than 0.01% of the cell capacity), and the micro charge may be repetitively performed a required number of times in accordance with various positive electrode potential behavior. In other words, delicate and active control of a positive electrode potential can be performed depending on a potential behavior of the positive electrode that is an object. Therefore, for example, even when a lithium-nickel complex oxide with high capacity retention is adopted as a positive electrode active material or when a positive electrode ternary active material or the like whose capacity retention is slightly lower than that of a lithium-nickel complex oxide is adopted as an active material, the positive electrode potential can be held at or above the Me dissolution potential in an efficient and optimal state. Accordingly, the effect described above can be produced in an efficient manner regardless of the type of the positive electrode.

According to a favorable aspect of the manufacturing method disclosed herein, the micro charge can be repeated for each period set on the basis of a drop rate of the positive electrode potential measured in advance. In other words, a positive electrode potential behavior (a drop rate of the positive electrode potential) after performing a micro charge is studied in advance with respect to a lithium secondary battery to be manufactured. From the positive electrode potential behavior, a holding time in which the positive electrode potential does not drop below the Me dissolution potential is obtained, whereby the holding time can be set as the period in which a micro charge is to be performed. Accordingly, an optimal process of rendering a metallic foreign substance harmless can be performed in a simple manner in accordance with the lithium secondary battery that is an object.

According to a favorable aspect of the manufacturing method disclosed herein, the micro charge is performed using a pulse current so that a charge time is 2 seconds or less. In addition, as for the amount of current, a current of 0.5 C or more such as a current of 1 C or more (typically 0.5 to 5 C, and more particularly 1 to 3 C) is favorably supplied. As described above, by supplying a large pulse current over a short period of time, the potentials of the positive electrode and the negative electrode can be adjusted in a short period of time. Therefore, the dissolution object metal species (ions) such as a mixing-anticipated metal species can be sufficiently diffused while preventing the metal ions from being locally deposited on the negative electrode. Furthermore, the micro charge using a pulse current enables delicate and active control of positive electrode potential behavior to be performed more effectively.

According to a favorable aspect of the manufacturing method disclosed herein, in the Me dissolution potential holding step, a connection with an external power supply is disconnected after the micro charge and the cell is allowed to stand in order to hold the positive electrode potential of the cell at or above the Me dissolution potential. In the Me dissolution potential holding step, the positive electrode potential drops due to a self-discharge of the positive electrode. Therefore, after the micro charge, the self-discharge can be prevented by, for example, detaching a charging terminal and disconnecting the connection with the external power supply. Accordingly, a drop in the positive electrode potential in the Me dissolution potential holding step can be prevented and a prescribed potential can be maintained over a longer period of time.

A favorable aspect of the manufacturing method disclosed herein further comprises performing a micro discharge after the micro charge. Since the micro discharge causes the lithium ions that are charge carriers to migrate from the side of the negative electrode to the side of the positive electrode, an effect of preventing a migration of metal ions of the dissolution object metal species toward the side of the negative electrode can be produced. In addition, by consecutively performing a micro charge and a micro discharge, the positive electrode potential rises by a certain amount due to a reaction of the discharge while holding the same negative electrode potential. Accordingly, a deposit preventing effect at the negative electrode can be produced in addition to an effect of holding the positive electrode at a desired potential by a discharge in addition to a charge.

According to a favorable aspect of the manufacturing method disclosed herein, an amount of discharge by the micro discharge is smaller than the amount of charge that is charged by the micro charge. For example, in the case of a ternary positive electrode whose capacity retention is slightly lower than a lithium-nickel complex oxide, repetitively performing a micro charge and a micro discharge tends to cause the positive electrode potential to continuously drop. However, by setting the amount of discharge lower than the amount of charge, the drop in positive electrode potential can be prevented and dissolution can be prolonged until the metal ions of the dissolution object metal species diffuses sufficiently. Adjustment of the amount of discharge and the amount of charge can be achieved by reducing (or increasing) a discharge current (or a charge current) or by reducing (or increasing) discharge time (or charge time).

According to a favorable aspect of the manufacturing method disclosed herein, the micro discharge is performed using a pulse current of 0.5 C or more. By performing a micro discharge with a relatively large current over a short period of time, potentials of the positive electrode and the negative electrode can be adjusted in a short period of time. Therefore, metal ions can be sufficiently diffused while preventing a dissolution object metal species such as a mixing-anticipated metal from being locally deposited on the negative electrode. In addition, the dissolution object metal species such as a mixing-anticipated metal that is deposited on the negative electrode can be prevented from being dissolved once again from the negative electrode. Moreover, the discharge time is 10 seconds or less and favorably 2 seconds or less.

According to a favorable aspect of the manufacturing method disclosed herein, copper (Cu) is set as the mixing-anticipated metal species (Me) and the micro charge is performed so that the positive electrode potential with respect to the metal lithium (Li) reference electrode exceeds a Cu dissolution potential at which Cu starts to dissolve. In other words, a metal with a highest oxidation-reduction potential among metallic foreign substances which are anticipated to be mixed in a manufacturing process of the lithium secondary battery and which have an oxidation-reduction potential within an operating voltage range of the lithium secondary battery and are likely to become ions is copper (Cu) which has an oxidation-reduction potential of approximately 3.2 V. The manufacturing method disclosed herein is devised to target copper in addition to iron (Fe) as mixing-anticipated metals that are likely to be mixed in, to promote dissolution of the mixing-anticipated metal species from the positive electrode, and to prevent concentrated deposition at the negative electrode. Accordingly, for example, the Me dissolution potential can be set to or higher than 3.2 V. In addition, a highest reachable potential of the negative electrode during a micro discharge is set lower than 3.2 V.

According to a favorable aspect of the manufacturing method disclosed herein, the positive electrode active material is made of a lithium-containing complex oxide including at least manganese, cobalt, and nickel and a content ratio of the nickel among transition metals constituting the lithium-containing complex oxide is less than 50 mole %. The active material has a high capacity but relatively low capacity retention. While the method disclosed herein does not limit the type of the positive electrode active material, advantages of the present invention can be effectively utilized by targeting a lithium secondary battery having a positive electrode active material such as that described above.

According to the method for manufacturing a lithium secondary battery described above, a short-circuit due to the existence of a metallic foreign substance can be prevented even if the metallic foreign substance is mixed into a surface of a positive electrode. Accordingly, the metallic foreign substance can be rendered harmless in a reliable manner. In other words, a method for manufacturing a lithium secondary battery whose battery performance is not affected by mixing of a foreign substance is provided. As a result, a highly-reliable lithium secondary battery is realized at lower cost.

DESCRIPTION OF EMBODIMENTS

Preferred embodiments of the present invention will be described below. Matters required to carry out the present invention, with the exception of matters specifically mentioned in the present specification, can be understood to be design matters of a person with ordinary skill in the art based on the prior art in the relevant technical field. The present invention can be carried out on the basis of the contents disclosed in the present specification and common general technical knowledge in the relevant field.

The manufacturing method according to the present invention is a method for manufacturing a lithium secondary battery comprising a positive electrode including a positive electrode active material made of a lithium-containing complex oxide, a negative electrode including a negative electrode active material capable of storing and releasing lithium ions, and a nonaqueous electrolyte that impregnates the positive electrode and the negative electrode. In the lithium secondary battery, a separator is typically interposed between the positive electrode and the negative electrode.

With such a lithium secondary battery, in a step of assembling a cell (in other words, a structure which constitutes the lithium secondary battery prior to performing an initial conditioning charge), the positive electrode and (typically, a separator and) the negative electrode are assembled and housed inside a battery case together with the nonaqueous electrolyte, and the battery case is sealed up to produce a cell. When assembling the lithium secondary battery (cell), there may be cases where, for example, a dissolution object metal species such as copper and iron is included in the positive electrode (for example, in a positive electrode active material layer formed on a positive electrode collector). When the positive electrode includes a metallic foreign substance, the metallic foreign substance (the dissolution object metal species) dissolves and metal ions are created as a potential of the positive electrode exceeds a dissolution potential of the metallic foreign substance during a charge. Conventionally, since the metal ions migrate between the positive and negative electrodes (typically, within the separator) in a straight line toward the negative electrode, the metal ions reach the negative electrode and are locally deposited at a position opposing the negative electrode as charging continues. Subsequently, as charging proceeds, the deposit on the negative electrode gradually grows toward the side of the positive electrode.

In order to prevent the deposit described above from growing, in the present embodiment, a preliminary charge, to be described later, that includes a micro charging step and a subsequent Me dissolution potential holding step is performed on the assembled cell prior to performing an initial conditioning charge.

Figure 1:
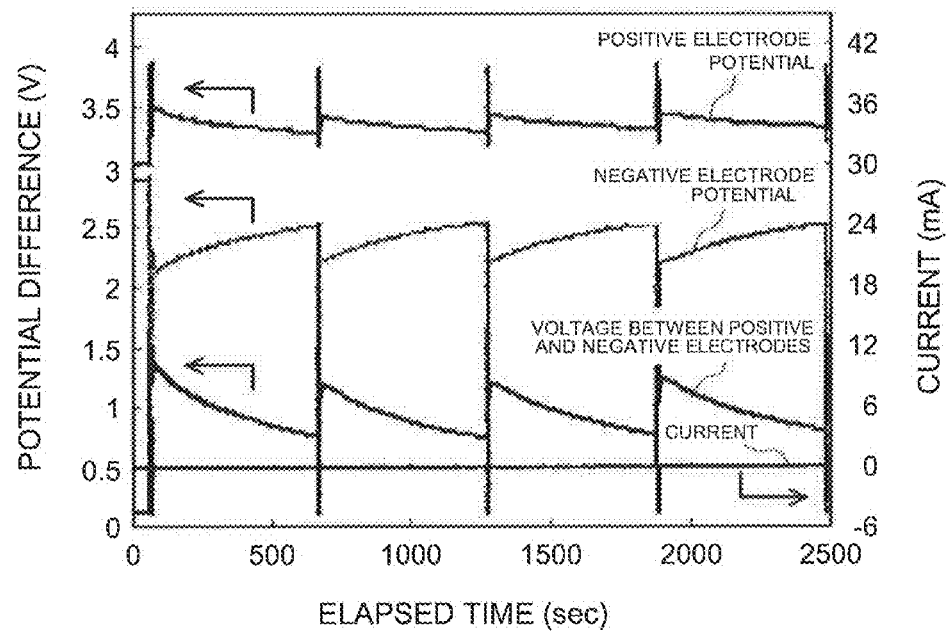
FIG. 1 is a diagram showing an example of a short-term potential behavior in a manufacturing method according to the present invention.

FIG. 1 is a diagram for explaining an example of a preliminary charge and presents, from the top of a graph, respective time variations of a positive electrode potential, a negative electrode potential, a potential difference between the positive electrode and the negative electrode (hereinafter, simply referred to as a potential difference), and a supplied current.

More specifically, in the micro charging step, as depicted by the time variation of the current shown in FIG. 1, a micro charge of a short period of time (for example, for a charge time of 10 seconds or less) is performed until a positive electrode potential with respect to a metal lithium (Li) reference electrode exceeds an Me dissolution potential set in advance at which a mixing-anticipated metal species (Me) starts to dissolve. The micro charge is set so that a highest reachable potential of the positive electrode with respect to the Li reference electrode exceeds the Me dissolution potential.

Moreover, the highest reachable potential can be appropriately set within a range exceeding the Me dissolution potential in accordance with a type of the mixing-anticipated metal species. For example, specifically, the highest reachable potential can be determined in consideration of an oxidation-reduction potential of various metal elements with respect to an oxidation-reduction potential of lithium. The oxidation-reduction potential may be the same as the dissolution potential. The example shown in FIG. 1 assumes copper (Cu) with a higher dissolution potential than iron (Fe) as the mixing-anticipated metal species (Me), and the Me dissolution potential (in this case, Cu) is 3.2 V (with respect to Li). In comparison, an actual highest reachable potential of the positive electrode due to the micro charge is approximately 3.9 V. Alternatively, the highest reachable potential of the positive electrode can be set to, for example, 4.0 V or higher.

In addition, the micro charge can be confirmed on a line representing a current behavior that is shown at the very bottom in the graph of FIG. 1 as a pulse that oscillates considerably up and down at elapsed time positions of approximately 0 seconds, approximately 600 seconds, approximately 1200 seconds, approximately 1800 seconds, . . . . The micro charge is continued for a short period of time of 10 seconds or less. Due to the micro charge, the positive electrode potential temporarily exceeds the dissolution potential of the mixing-anticipated metal. Therefore, the mixing-anticipated metal dissolves and creates metal ions, and the metal ions migrate between the positive and negative electrodes (typically, within the separator) towards the negative electrode.

Moreover, the micro charge is favorably performed so that an amount of charge during the micro charge is below 0.01% of a capacity of the cell. By performing a charge of such a small amount of charge, the positive electrode potential can be controlled efficiently and more effectively.

The preliminary charge subsequently includes the Me dissolution potential holding step in which the positive electrode potential of the cell is held at or above the Me dissolution potential for a prescribed period of time. The Me dissolution potential holding step is continued (for a prescribed period of time) until a determination is made that the dissolution object metal species that is a mixing-anticipated metal or the like has been sufficiently dissolved and diffused and can be deposited on the negative electrode in a form that does not affect battery performance. Moreover, the period of time (the prescribed period of time over which the Me dissolution potential holding step is continued can be determined in consideration of (1) a size of a foreign object made of the mixing-anticipated metal species (Me), (2) a magnitude of the highest reachable potential, and (3) a target overall process time. Accordingly, the mixing-anticipated metal mixed into the cell can be rendered harmless by the lithium secondary battery disclosed herein.

In addition, in the manufacturing method disclosed herein, in the Me dissolution potential holding step, a micro charge can also be repeated once or twice or more within a prescribed period of time in order to hold the positive electrode potential of the cell at or above the Me dissolution potential. As depicted by the topmost line in the graph shown in FIG. 1, the positive electrode potential of the cell typically reaches a highest reachable potential exceeding the Me dissolution potential (in this case, 3.2 V) due, to the micro charge in the micro charging step and subsequently drops gradually in a range exceeding 3.2 V. The degree of the drop is dependent on characteristics of the positive electrode that is used in the cell. Therefore, when the positive electrode potential of the cell drops below the Me dissolution potential within a prescribed period of time, a micro charge is performed to hold the positive electrode potential of the cell at a value exceeding the Me dissolution potential before the positive electrode potential of the cell drops below the Me dissolution potential.

Such a micro charge in the Me dissolution potential holding step can be repeated once or twice or more within a prescribed period of time. As a result, the migration of metal ions made of the dissolution object metal species toward the negative electrode is mitigated and the metal ions are sufficiently diffused between the positive and negative electrode and more typically within the separator. Accordingly, since the metal ions only reach the negative electrode after being diffused, a local deposition of the metal ions at a specific location of the negative electrode can be prevented. In other words, a deposit of the metal ions made of the dissolution object metal species is formed relatively thinly over a wide range and growth of the deposit toward the positive electrode is prevented.

Figure 2:
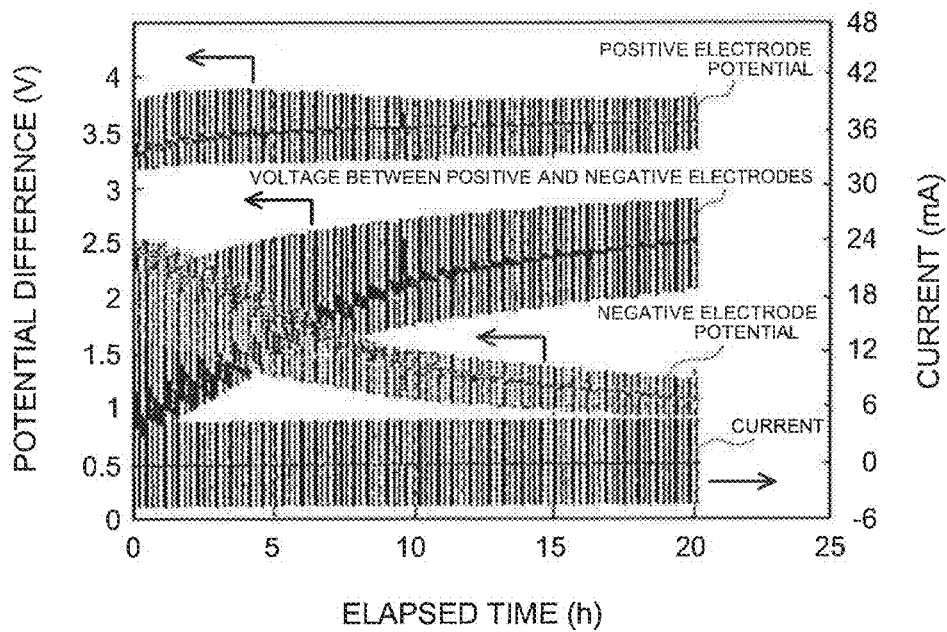
FIG. 2 is as diagram showing a long-term potential behavior shown in FIG. 1.

While the number of repetitions of the micro charge is not particularly limited, the larger the number of repetitions, the greater the expected effect of preventing a concentrated deposition of the metal ions. The number of repetitions can be appropriately determined in accordance with the characteristics of the lithium secondary battery to be manufactured such as capacity retention and a prescribed holding time. For example, the number of repetitions may be set to 10 or higher or to 100 or higher. For example, FIG. 2 is a diagram showing an example in which the short-term (0 to 2500 seconds) potential behavior in the preliminary charge shown in FIG. 1 is performed over a long period (0 to 20 hours). For example, when manufacturing a lithium secondary battery using a ternary positive electrode, as shown in FIG. 2, a micro charge is repetitively performed at intervals of around 10 minutes over a prescribed period of time (20 hours) for a total of around 120 repetitions. FIG. 2 shows that the positive electrode potential is held at or above approximately 3.2 V (specifically, at or above 3.4 V) even during the standing time and the dissolution object metal species is being sufficiently dissolved and diffused. Conversely, when manufacturing a lithium secondary battery using a lithium-nickel positive electrode with high capacity retention, for example, the series of steps including the micro charging step and the holding step may be repetitively performed at intervals of around 120 minutes over around 20 hours for a total of around 10 repetitions.

The micro charge in the Me dissolution potential holding step described above can be repeated for, for example, each period set on the basis of a drop rate of the positive electrode potential measured in advance. In other words, a period of performing a micro charge can be set by studying a positive electrode potential behavior (a drop rate of the positive electrode potential) in advance with respect to a battery (cell) to be manufactured and obtaining a holding time over which the positive electrode potential does not drop below the Me dissolution potential. For example, in the example shown in FIG. 2, the micro charge period is set to 10 minutes. Accordingly, a process of rendering a metallic foreign substance harmless which is optimal for the lithium secondary battery that is an object can be performed in a simple manner.

Figure 3:
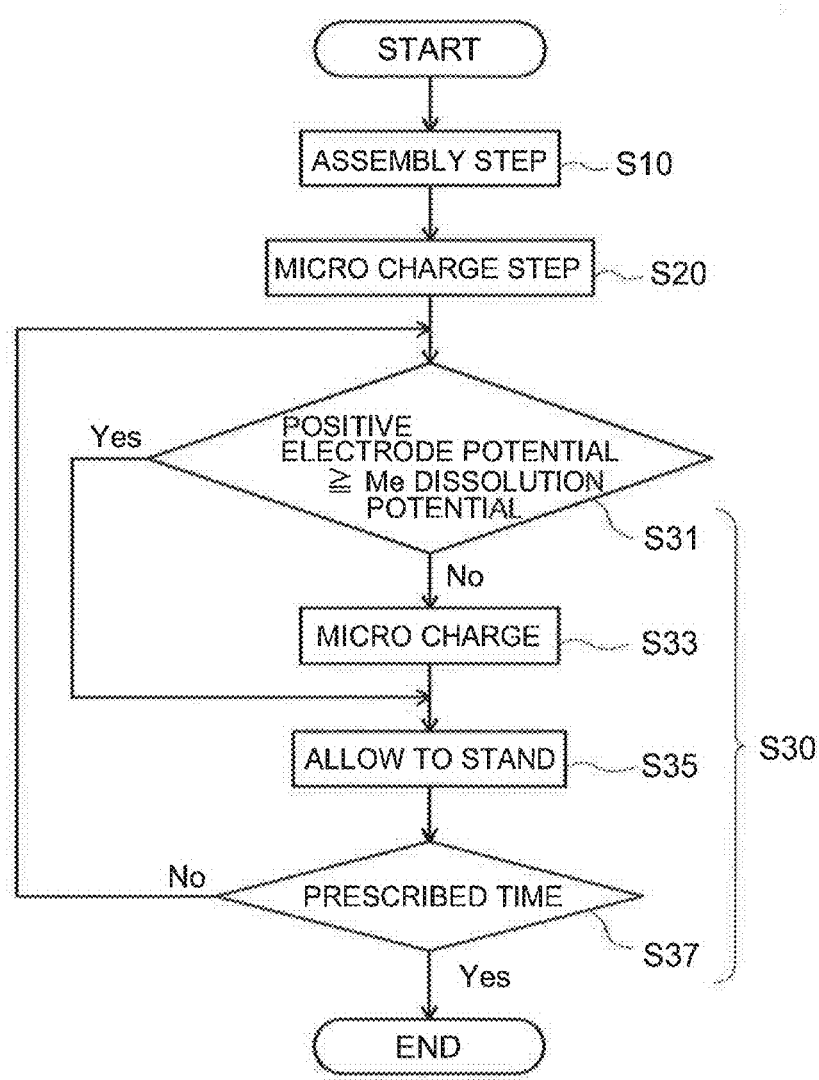
FIG. 3 is a process flow chart according to an embodiment of the present invention.

On the other hand, the micro charge described above can be performed when the preliminary charge is performed while measuring a potential of the positive electrode and upon the potential of the positive electrode reaching an arbitrary set potential that is equal to or above the Me dissolution potential. For example, FIG. 3 is a flow chart showing an example of the present manufacturing method. After the step of assembling a cell (S10) is completed, the preliminary charge is performed before performing an initial conditioning charge (main charge). The positive electrode potential behavior during the preliminary charge can be grasped by taking measurements in real time. A micro charge is performed in the micro charging step (S20), and the positive electrode potential of the cell is temporarily raised to a value exceeding the Me dissolution potential. Subsequently, while a transition is made to the Me dissolution potential holding step (S30), whether or not a relationship expressed as positive electrode potential≥Me dissolution potential is maintained is confirmed while measuring the potential of the positive electrode (S31). When the relationship is maintained, the cell is allowed to stand as-is (S35) until a prescribed period of time expires (S37). On the other hand, when the relationship expressed as positive electrode potential≥Me dissolution potential (S31) is not maintained, a micro charge (S33) is performed to raise the positive electrode to a value exceeding the Me dissolution potential. The confirmation of positive electrode potential≥Me dissolution potential (S31) is made at an appropriate timing before the prescribed period of time expires (S37). Even in this manner, a process of rendering a metallic foreign substance harmless which is optimal for the lithium secondary battery that is an object can be performed in a simple manner.

To describe this mode of micro charge in greater detail, the current and the duration of the micro charge can be appropriately set within a range of a charge time of 10 seconds or less and favorably within a range of an amount of charge of less than 0.01% of the cell capacity. In the present invention, since the dissolution object metal species can be gradually dissolved even in the holding step, the charge time for the micro charge can be set significantly shorter than what is conventional. A longer micro charge time tends to increase the likelihood of the metal ions being deposited on the negative electrode in a concentrated manner. Therefore, according to a favorable aspect of the present invention, the micro charge is performed using a pulse current so that the charge time is 2 seconds or less. In this case, a pulse-shaped voltage is applied between the positive electrode and the negative electrode. From the perspective of promoting dissolution of the dissolution object metal species, the pulse current used for the micro charge is favorably relatively sharp. The duration of such a micro charge can be favorably set to, for example, 2 seconds or less such as 1 second or 0.5 seconds. The current value is favorably set to 0.5 C or more and can be set to, for example, 1 C, 2 C, 3 C, 5 C, or the like. Moreover, each charge time and each current value when performing the micro charge as plurality of times may be the same or may differ from one another.

Furthermore, in the manufacturing method disclosed herein, favorably, in the Me dissolution potential holding step, a connection with an external power supply is disconnected after the micro charge and the cell is allowed to stand in order to hold the positive electrode potential of the cell at or above the Me dissolution potential. After the micro charge, although potentials of the positive electrode and the negative electrode are maintained, a drop in the positive electrode potential due to self-discharge is actually observed. In the present invention, since the amount of charge is set to a small amount that is less than 0.01% of the capacity of the cell, the drop in positive electrode potential due to self-discharge has a major effect. Therefore, in the Me dissolution potential holding step, the self-discharge can be prevented by, for example, detaching a charging terminal and disconnecting the connection with the external power supply when a micro charge is not being performed.

Figure 4:
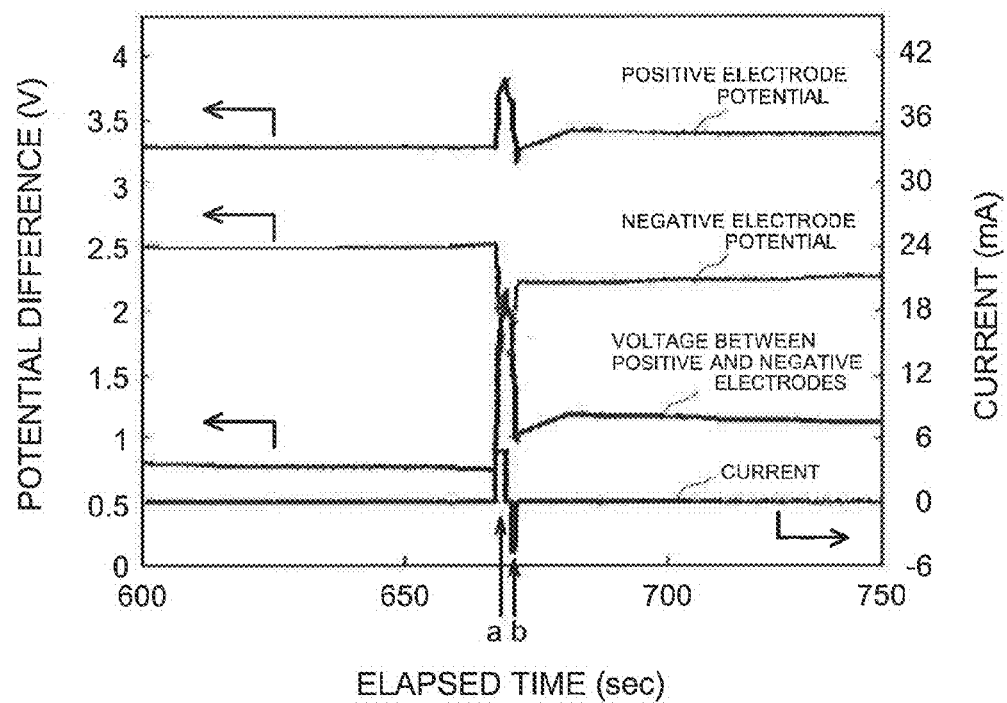
FIG. 4 is a diagram for explaining an example of a potential behavior when combining a micro charge and a micro discharge.

In addition, a favorable aspect of the manufacturing method disclosed herein further comprises performing a micro discharge after the micro charge. FIG. 4 is a diagram for explaining an example of a potential behavior when a micro discharge is performed after a micro charge. For example, when a micro charge is performed at time "a", the potential of the positive electrode temporarily rises to form a pulse and the potential immediately after the micro charge exceeds the potential prior to the micro charge. In addition, the negative electrode potential temporarily drops to form a pulse and the potential immediately after the micro charge drops below the potential prior to the micro charge. While lithium ions migrate from the positive electrode to the negative electrode at this point, since a potential gradient is small, a force acting on the lithium ions and the metal ions is relatively weak. As a micro discharge is subsequently performed at time "b", while the negative electrode is hardly affected by an ion reaction and the potential of the negative electrode remains unchanged, a phenomenon in which the potential rises after the micro discharge due to a reaction of the lithium ions and a reaction caused by the diffusion is observed at the positive electrode. As a result, the lithium ions migrate from the negative electrode to the positive electrode and block the movement of the metal ions. In other words, by first performing a micro charge so that the positive electrode attains a higher potential than a target potential and then lowering the potential of the positive electrode to the target potential by performing a micro discharge, the positive electrode potential rises by a certain amount due to the reaction and the negative electrode is held in a state where the potential has risen. Therefore, by performing a micro charge and a micro discharge in combination instead of raising the positive electrode to the target potential by a micro charge alone, both an effect of facilitating dissolution at the positive electrode and an effect of preventing deposition at the negative electrode can be enhanced.

The amount of charge of the micro charge and the amount of discharge of the micro discharge may be the same or one may be greater than the other. However, setting the amount of charge so as to be equal to or smaller than the amount of discharge is unfavorable because discharge occurs as a whole including the effect of self-discharge and a possibility arises that the positive electrode potential may drop continuously. In particular, when using a so-called ternary lithium-transition metal oxide that includes manganese (Mn), cobalt (Co), and nickel (Ni) as a positive electrode active material, since the amount of self-discharge is large, there is a strong tendency of the positive electrode potential dropping continuously. Therefore, a capacity of the micro charge is favorably set larger than a capacity of the micro discharge. By setting the capacity of the micro charge larger than the capacity of the micro discharge, a drop in the positive electrode potential can be prevented and dissolution can be prolonged until the dissolution object metal species dissolves sufficiently.

In addition, in the present embodiment, a pulse-shaped voltage is also applied during the micro discharge between the positive electrode and the negative electrode so that a current waveform assumes a pulse shape. The current and the duration of the micro discharge can be appropriately set in a similar manner to the micro charge. For example, as described above, the current and the duration of the micro discharge can be set so that the amount of charge exceeds the discharge capacity. The pulse duration is set to 10 seconds or less and favorably to 5 seconds or less. For example, the pulse duration can be set to 2 seconds or less and to 1 second or 0.5 seconds. From the perspective of sufficiently mitigating the deposition of the metal ions, the current value during the micro discharge is favorably set relatively high. This is because a relatively high current is capable of rapidly dropping the potential of the positive electrode and rapidly raising the potential of the negative electrode. While the current value during a micro discharge is also not particularly limited, for example, a current value of 0.5 C or higher is favorable and a current value of 1 C or higher is more favorable. For example, a discharge from 0.5 to 5 C and particularly about from 1 to 3 C is favorable. Moreover, the current value of the micro discharge and the current value of the micro charge may be the same or one may differ from the other. In addition, the micro discharge may be performed a plurality of times and the current value for each time may be the same or may differ from one another. In the example shown in FIG. 4, the current values of the micro charge and the micro discharge are approximately 5 A. In addition, in FIG. 4, a current during a charge is depicted as a positive current and a current during a discharge is depicted as a negative current. Furthermore, while the micro discharge is performed after the micro charge, an interval of around several seconds such as around 1 to 2 seconds may be provided between the micro charge and the micro discharge.

After the preliminary charge described above is completed, the cell is allowed to stand for a duration of, for example, 30 minutes or more and a main charge (initial conditioning charge) is subsequently performed. Unlike the micro charge, the main charge is performed over a period of time that significantly exceeds 10 seconds. Due to the main charge, the lithium secondary battery is charged to a prescribed battery capacity.

As described above, with the manufacturing method according to the present embodiment, first, in the micro charging step, the positive electrode potential is raised to a value exceeding the Me dissolution potential of a mixing-anticipated metal by performing a micro charge and a dissolution object metal species such as the mixing-anticipated metal is dissolved (ionized) from the positive electrode. Next, in the Me dissolution potential holding step, the dissolved metal ions are diffused into the nonaqueous electrolyte. In the Me dissolution potential holding step, a micro discharge is performed as necessary in order to raise the dropping positive electrode potential to once again dissolve the dissolution object metal species from the positive electrode and to prevent the deposition of the metal ions on the negative electrode. By following up the micro charge with a micro discharge, the diffusion of metal ions can be further promoted. Subsequently, by repetitively performing a micro charge at appropriate timings as necessary, the dissolution object metal species on the positive electrode can be sufficiently dissolved and the dissolved metal ions can be sufficiently diffused. As a result, the dissolution object metal species is diffused and deposited on the negative electrode without adversely affecting battery performance.

Figure 5:
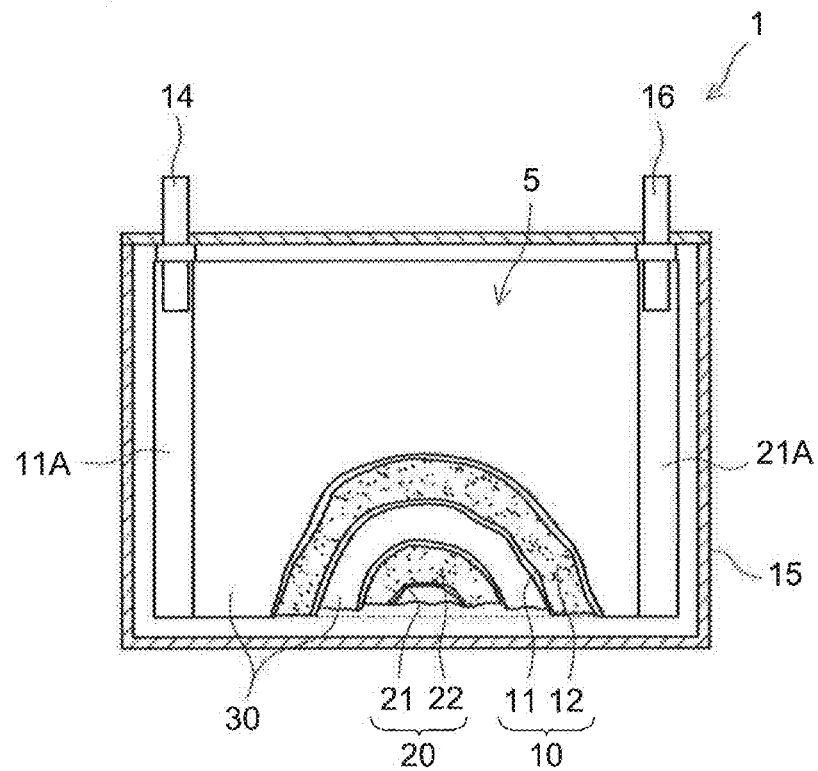
FIG. 5 is a sectional view showing a partially cut-out lithium secondary battery according to an embodiment.

Forms, capacities, applications, and the like of lithium secondary batteries manufactured by the manufacturing method according to the present embodiment are not particularly limited. Next, a lithium-ion battery 1 will be described as an example of a lithium secondary battery with reference to FIG. 5.

The lithium-ion battery 1 comprises a flat square-shaped battery case 15. An electrode body 5 is housed in this battery case 15. The electrode body 5 is constituted by a positive electrode 10, a negative electrode 20, and two separators 30 which are respectively formed in sheet shapes. The positive electrode 10, the negative electrode 20, and the separators 30 are overlaid on top of each other and wound in an order of the separator 30, the positive electrode 10, the separator 30, and the negative electrode 20. The wound electrode body 5 is pressed from the sides and formed in a flat shape so as to conform to the shape of the battery case 15.

The positive electrode 10 includes a positive electrode collector 11 and a positive electrode active material layer 12 which includes a positive electrode active material and which is provided on the positive electrode collector 11. The positive electrode active material layer 12 is formed on both surfaces of the positive electrode collector 11. The negative electrode 20 includes a negative electrode collector 21 and a negative electrode active material layer 22 which includes a negative electrode active material and which is provided on the negative electrode collector 21. The positive electrode active material layer 12 is not formed at one end of the positive electrode collector 11 in as longitudinal direction. A positive electrode terminal 14 is connected to an exposed portion 11A of the positive electrode collector 11. In a similar manner, the negative electrode active material layer 22 is not formed at one end of the negative electrode collector 21 in the longitudinal direction and a negative electrode terminal 16 is connected to an exposed portion 21A of the negative electrode collector 21.

The lithium-ion battery 1 is constructed by inserting the electrode body 5 to which the terminals 14 and 16 are connected into the battery case 15, supplying a nonaqueous electrolyte (not shown) to the inside of the battery case 15, and subsequently sealing the battery case 15.

As the positive electrode collector 11, an electrically conductive member made of metal with good electrical conductivity can be favorably used in a similar manner to an electrode collector that is used in a positive electrode of a conventional lithium secondary battery (typically, a lithium-ion battery). For example, a metal that includes aluminum, nickel, titanium, iron, or the like as a main component or an alloy that includes these metals as main components can be used. A shape of the positive electrode collector is not particularly limited and various shapes can be considered in accordance with a shape or the like of the lithium secondary battery. For example, various forms such as a rod shape, a plate shape, a sheet shape, a foil shape, and a mesh shape may be adopted. Typically, a sheet-shaped aluminum positive electrode collector is used.

As the positive electrode active material, a lithium-containing transition metal oxide capable of storing and releasing lithium is used. One or two or more substances that are conventionally used in lithium secondary batteries (for example, an oxide with a layered structure or an oxide with a spinel structure) can be used without particular limitations. Examples of such substances include lithium-containing complex oxides such as a lithium-nickel complex oxide, a lithium-cobalt complex oxide, a lithium-manganese complex oxide, and a lithium-magnesium complex oxide. In addition, positive electrode active materials that enable the advantages of the present invention to be produced more effectively include a ternary lithium-containing transition metal oxide including manganese, nickel, and cobalt (in particular, a ternary lithium-containing transition metal oxide in which a content ratio of the nickel among transition metals constituting the lithium-containing complex oxide is less than 50 mole %).

In this case, for example, the term "lithium-nickel complex oxide" is used so as to include an $\alpha$-NaFeO$_2$ type lithium nickel oxide (LiNiO$_2$) having lithium (Li) and nickel (Ni) as constituent metal elements as well as oxides containing at least one metal element other than lithium and nickel (in other words, a transition metal element and/or a representative metal element other than Li and Ni) at a nickel site (a transition metal site) of LiNiO$_7$ so that a proportion of nickel is maintained at or above 50%. For example, the metal element other than Li and Ni described above can be one or two or more metal elements selected from the group consisting of cobalt (Co), aluminum (Al), manganese (Mn), chromium (Cr), iron (Fe), vanadium (V), magnesium (Mg), titanium (Ti), zirconium (Zr), niobium (Nb), molybdenum (Mo), tungsten (W), copper (Cu), zinc (Zn), gallium (Ga), indium (In), tin (Sn), lanthanum (La), and cerium (Ce). The same description applies to the terms "lithium-cobalt complex oxide", "lithium-manganese complex oxide", and "lithium-magnesium complex oxide".

In addition, a so-called ternary lithium-containing complex oxide including at least three transition metal elements such as manganese, cobalt, and nickel (typically, LiNi$_{1/3}$Mn$_{1/3}$Co$_{1/3}$O$_2$) and a so-called lithium-rich lithium-containing complex oxide that includes a high content of lithium (typically, xLi[Li$_{1/3}$Mn$_{2/3}$]O$_2$.(1-x)LiMeO$_2$, where 0<x<1 and Me denotes a transition metal element) can also be used.

Furthermore, olivine type lithium phosphate whose general formula is expressed by LiMPO$_4$ (where M denotes at least one or more elements among Co, Ni, Mn, and Fe; for example, LiFeO$_4$ or LiMnPO$_4$) may be used as the positive electrode active material.

A compound constituting such a positive electrode active material can be prepared and provided by conventionally known methods. For example, a target lithium-containing complex oxide can be prepared by mixing several raw material compounds that are appropriately selected in accordance with atomic composition at a prescribed mole ratio and sintering the compound using suitable means at a prescribed temperature. In addition, by pulverizing, granulating, and classifying the sintered product tying suitable means, a granular positive electrode active material powder substantially constituted by secondary particles having a desired average particle diameter and/or a particle diameter distribution can be obtained. It is to be understood that the method itself of preparing a positive electrode active material (such as a lithium-containing complex oxide powder) does not characterize the present invention in any way.

In addition to the positive electrode active materials described above, the positive electrode active material layer 12 can contain an electrically conductive material, a binder, or the like as necessary. As the electrically conductive material, for example, a carbon material such as carbon black (for example, acetylene black, furnace black, or Ketjen black) and graphite powder can be favorably used. One or two or more of these materials may be used in combination. As the binder, a polymer material that is soluble or dispersible in water can be favorably adopted. Examples of polymer materials that are soluble in water (water-soluble) include: cellulose-based polymers such as carboxymethyl cellulose (CMC), methyl cellulose (MC), cellulose acetate phthalate (CAP), and hydroxypropyl methyl cellulose (HPMC); polyvinyl alcohol (PVA); and the like. In addition, polymer materials that are dispersible in water (water-dispersible) include: vinyl-based polymers such as polyethylene (PE) and polypropylene (PP); fluorine-based resins such as polyethylene oxide (PEO), polytetrafluoroethylene (PTFE), and tetrafluoroethylene-perfluoroalkyl vinyl ether copolymer (PFA); vinyl acetate copolymers; and rubbers such as styrene-butadiene rubber (SBR). Moreover, binders are not limited to water-based binders and solvent-based binders such as polyvinylidene fluoride (PVDF) can also be used.

As the negative electrode collector 21, an electrically conductive member with good electrical conductivity can be favorably used. For example, a copper material, a nickel material, or an alloy material including copper and nickel as main components is favorably used. The shape of the negative electrode collector may be similar to the shape of the positive electrode. Typically, a sheet-shaped copper negative electrode collector is used.

The negative electrode active material need only be a material capable of storing and releasing lithium, and one or two or more negative electrode active materials conventionally used in lithium secondary batteries can be used without particular limitations. Examples of materials that can be used include: carbon materials such as black lead (graphite); oxide materials including lithium-titanium oxide (Li$_4$Ti$_5$O$_{12}$); metal materials made of a metal such as tin, aluminum (Al), zinc (Zn), and silicon (Si) or a metal alloy including these metal elements as main components, and the like. Typical examples that are favorably used include granular carbon materials (carbon powder) containing a graphite structure (layered structure) in at least a portion thereof. Carbon materials having a so-called graphitic structure (graphite), a non-graphitizable carbonaceous structure (hard carbon), a graphitizable carbonaceous structure (sat carbon) or a combination thereof can also be preferably used.

In addition to the negative electrode active materials described above, the negative electrode active material layer 22 formed on the negative electrode 20 can also contain one or two or more materials that can be compounded in, for example, the positive electrode active material layer described earlier. As such materials, various materials capable of functioning as a binder, a dispersant, and the like such as those listed above as constituent materials of the positive electrode active material layer 12 can be used in a similar manner. Moreover, binders are not limited to water-based binders and solvent-based binders such as polyvinylidene fluoride (PVDF) can also be used.

The positive electrode 10 and the negative electrode 20 according to the present embodiment can be manufactured by a conventional method. Specifically, a paste-like compound (hereinafter, referred to as an active material layer-forming paste) obtained by dispersing the active material, the binder, and the like described earlier in a suitable solvent that is similar to those conventionally used (such as water and organic solvents) is prepared. The prepared active material layer-forming paste is applied to the collectors 11 and 21 which are then dried and compressed (pressed) to obtain electrodes in which an active material layer is provided in the collector.

The nonaqueous electrolyte (not shown) is an organic solvent (a nonaqueous solvent) containing a lithium salt as a supporting electrolyte. A nonaqueous electrolyte that is a liquid at room temperature (in other words, an electrolytic solution) can be favorably used. As the lithium salt, for example, known lithium salts that are conventionally used as a supporting electrolyte of a nonaqueous electrolyte of lithium secondary batteries can be appropriately selected and used. Examples of such lithium salts include $LiPF_6$, $LiBF_4$, $LiClO_4$, $LiAsF_6$, $Li(CF_3SO_2)_2N$, $LiCF_3SO_3$, and the like. Only one of the supporting electrolytes can be used independently, or two or more of the supporting electrolytes may be used in combination. A particularly favorable example is $LiPF_6$.

As the nonaqueous solvent, organic solvents used in general lithium secondary batteries can be appropriately selected and used. Examples of particularly favorable nonaqueous solvents include carbonates such as ethylene carbonate (EC), dimethyl carbonate (DMC), ethyl methyl carbonate (EMC), diethyl carbonate (DEC), and propylene carbonate (PC). Only one of the organic solvents can be used independently, or two or more of the organic solvents may be used in combination.

A separator similar to what is conventional can be used as the separator 30. For example, a porous sheet made of resin (a microporous resin sheet) can be favorably used. Polyolefin resins such as polyethylene (PE), polypropylene (PP), and polystyrene are favorable as a constituent material of the porous sheet. In particular, porous polyolefin sheets such as a PE sheet, a PP sheet, a two-layer structure sheet in which a PE layer and a PP layer are laminated, and a three-layer structure sheet in which a single PE layer is sandwiched between two PP layers can be suitably used. Moreover, there may be eases where the separator is not required when a solid electrolyte or a gel-like electrolyte is used as the electrolyte (in this case, the electrolyte itself is capable of functioning as a separator).

Figure 6:
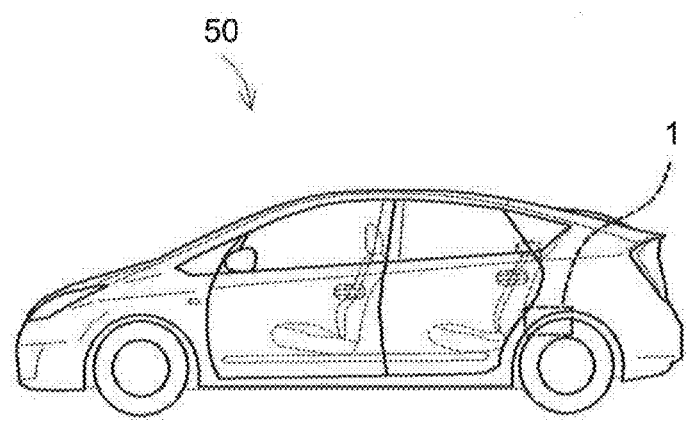
FIG. 6 is a diagram showing an example of a vehicle comprising a lithium secondary battery according to an embodiment.

Applications of the lithium secondary battery according to the present embodiment are not particularly limited. As described above, since the lithium secondary battery according to the present embodiment is capable of preventing an internal short-circuit to a high degree, the lithium secondary battery offers high reliability and superior input/output performance. Therefore, the lithium secondary battery according to the present embodiment can particularly be suitably used as a motor (electric motor) that is mounted to a vehicle such as an automobile. For example, as shown in FIG. 6, the lithium-ion battery 1 can be preferably used as a power source of a vehicle-driving motor (electric motor) to be mounted to a vehicle 50 such as an automobile. Although the vehicle 50 is not limited to any particular type, the vehicle 50 is typically a hybrid automobile, an electrical vehicle, a fuel cell vehicle, or the like. The lithium-ion battery 1 may be used independently or used in a mode of an assembled battery in which a plurality of the lithium-ion batteries 1 are connected in series and/or in parallel.

Next, an example of the present invention will be described. However, it is to be understood that the following description is not intended to limit the present invention to the specific example below.

<Preparation of Test Cell>

A small laminated cell (lithium secondary battery) for testing was constructed as described below.

First, to form the positive electrode active material layer of the positive electrode, a positive electrode active material layer-forming paste was prepared. The paste was prepared by mixing a ternary lithium-transition metal oxide ($LiNi_{1/3}Mn_{1/3}Co_{1/3}O_2$) as the positive electrode active material, acetylene black (AB) as the electrically conductive material, and polyvinylidene fluoride (PVDF) as the binder in ion exchange water so that the materials assumed a mass % ratio of 87:10:3. Next, the positive electrode active material layer-forming paste was applied to one surface of an aluminum foil (with a thickness of 15 μm) as the positive electrode collector and dried so that a coating amount of the positive electrode active material per unit area of the positive electrode collector was approximately 12 mg/cm². After drying, a roller press machine was used to stretch the positive electrode collector into a sheet shape with a thickness of approximately 90 μm, and the sheet was slit so that the positive electrode active material layer assumed a prescribed width to fabricate the positive electrode (positive electrode sheet). Moreover, copper particles with a diameter of 100 μm and a thickness of 6 μm were adhered on the active material layer of the positive electrode as a metallic foreign substance.

Next, a negative electrode active material layer-forming paste for fabricating the negative electrode of the lithium secondary battery was prepared. The paste was prepared by mixing graphite as the negative electrode active material and styrene-butadiene-styrene block copolymer (SBR) and carboxymethyl cellulose (CMC) as hinders in ion exchange water so that the materials assumed a mass % ratio of 98:1:1. The paste was applied to one surface of a copper foil (with a thickness of 10 μm) as the negative electrode collector and dried so that a coating amount of the negative electrode active material per unit area of the negative electrode collector was approximately 6.5 mg/cm². After drying, a roller press machine was used to stretch the negative electrode collector into a sheet shape with a thickness of approximately 60 μm, and the sheet was slit so that the negative electrode active material layer assumed a prescribed width to respectively fabricate the negative electrode (negative electrode sheet).

<Assembly of Test Cell>

A laminated cell (lithium secondary battery) for testing was constructed using the positive electrode sheet and the negative electrode sheet prepared as described above. Specifically, with a separator placed in-between, the positive electrode sheet (with a dimension of approximately 23 mm×23 mm) and the negative electrode sheet (with a dimension of approximately 25 mm×25 mm) were laminated so that the respective active material layers of the electrode sheets opposed each other to fabricate the electrode body. Moreover, a reference electrode created by pasting a lithium metal foil onto a nickel lead was installed separated from the negative electrode sheet on a negative electrode-side surface of the separator in order to measure respective lithium-based potentials of the positive electrode and the negative electrode. A three-layer film made up of polypropylene/polyethylene/polypropylene (a PP/PE/PP film) was used as the separator.

The electrode body was housed in a laminated bag-like battery container together with a nonaqueous electrolytic solution, and the battery container was sealed to construct two test lithium secondary batteries (which will be referred to as Sample 1 and Sample 2). As the nonaqueous electrolytic solution, a nonaqueous electrolytic solution prepared by incorporating 1 mole/L of $LiPF_6$ (LPFO) as a lithium salt and 0.05 mole/L of $LiPF_2(C_2O_4)_2$ as an additive into a mixed solvent containing ethylene carbonate (EC), diethyl carbonate (DEC), and ethyl methyl carbonate (EMC) at a volume ratio of 3:7 was used.

<Preliminary Charge>

Figure 7:
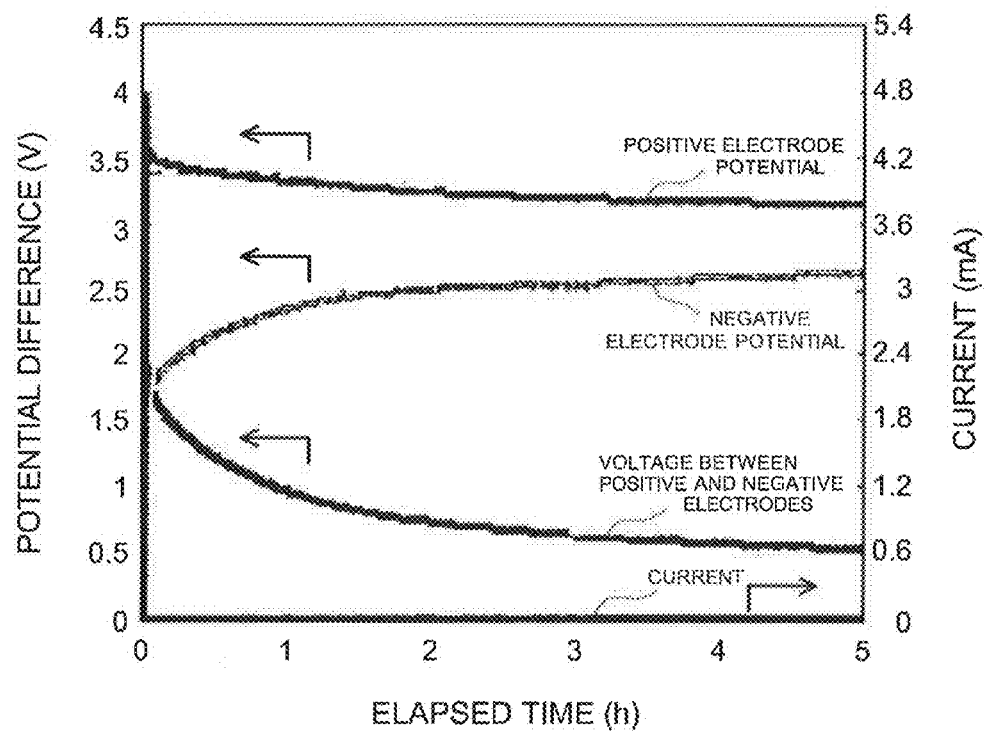
FIG. 7 is a diagram showing another example of a long-term potential behavior in the manufacturing method according to the present invention.

A preliminary charge such as that shown in FIG. 7 was performed on Sample 1 and a preliminary charge such as that shown in FIGS. 1 and 2 was performed on Sample 2 at 20 hours after the electrode body was impregnated by the non-aqueous electrolyte. Moreover, FIGS. 1, 2, and 7 are graphs showing time variations of a positive electrode potential, a negative electrode potential, a potential difference, and a supply current. During a micro charge and a micro discharge, a pulse-shaped current was supplied by applying a pulse voltage between the positive electrode and the negative electrode.

Specifically, with Sample 1, after performing a micro charge of 0.5 seconds at a current of 2 C, the sample was allowed to stand to check potential behavior. The highest reachable potential of the positive electrode during an initial micro charge was 4.0 V.

In addition, with Sample 2, in the micro charging step, after a micro charge performed for 2 seconds at 1.25 C followed by a wait period of 1 second, a discharge was performed for 0.5 seconds at 1.25 C. Subsequently, a similar micro charge and micro discharge were repetitively performed every 600 seconds for a total of 120 repetitions. The highest reachable potential of the positive electrode during the initial micro charge was 3.9 V and the highest reachable potentials of the positive electrode during second and subsequent micro charges were approximately 3.7 V to 3.9 V. All of the highest reachable potentials were equal to or higher than 3.2 V. Moreover, the highest reachable potentials of the negative electrode during the micro discharges were approximately 1.5 V to 2.7 V and were all equal to or lower than 3.2 V.

<Evaluation>

Figure 8:
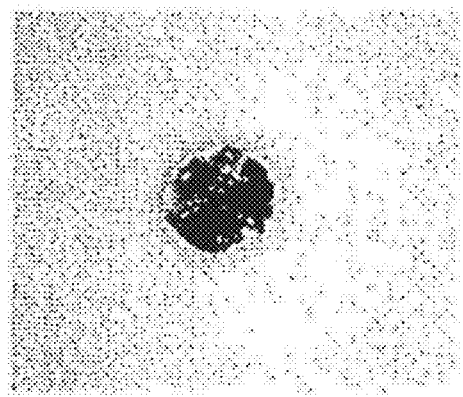
FIG. 8 is an observed image showing an example of a metallic foreign substance mixed into a surface of a positive electrode.
Figure 9A:
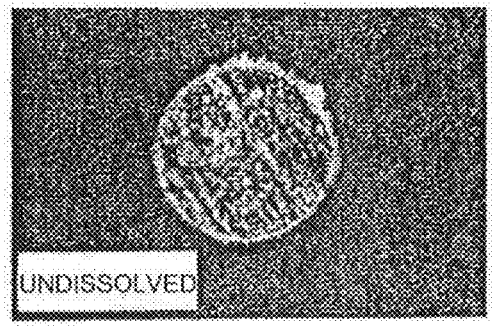
FIG. 9A is an observed image showing an example of a positive electrode surface after a preliminary charge according to a comparative example.
Figure 9B:
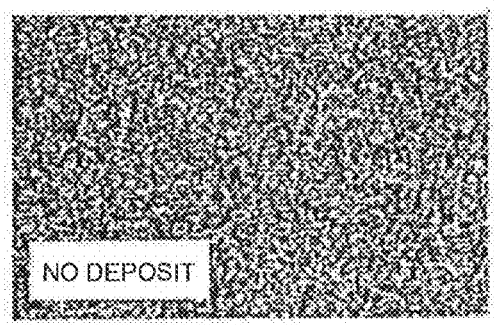
FIG. 9B is an observed image showing an example of a positive electrode-side surface of a separator after as preliminary charge according to the comparative example.
Figure 9C:
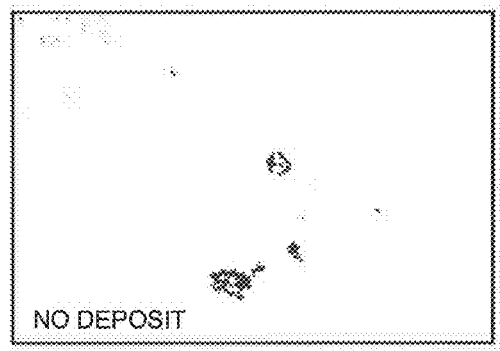
FIG. 9C is an observed image showing an example of a negative electrode-side surface of the separator after a preliminary charge according to the comparative example.
Figure 9D:
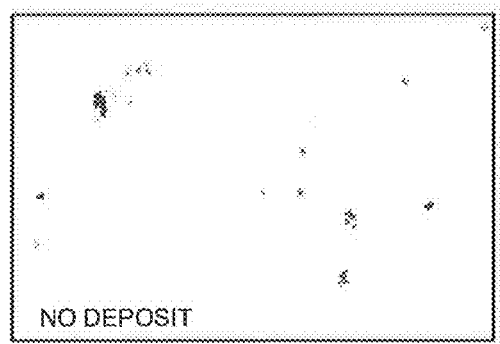
FIG. 9D is an observed image showing an example of as negative electrode surface after a preliminary charge according to the comparative example.
Figure 10A:
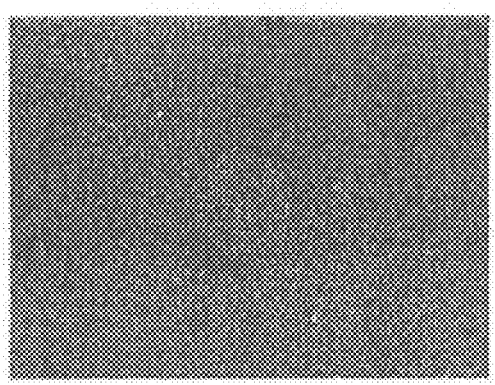
FIG. 10A is an observed image showing an example of a positive electrode surface after a preliminary charge according to an embodiment.
Figure 10B:
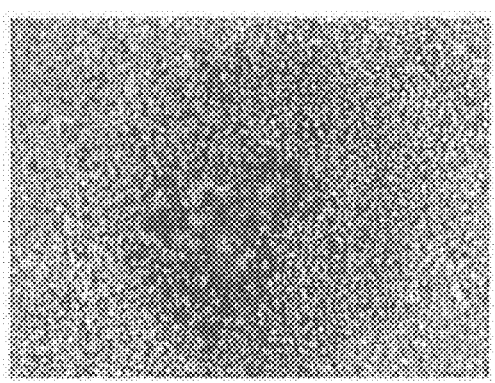
FIG. 10B is an observed image showing an example of a positive electrode-side surface of a separator after a preliminary charge according to the embodiment.
Figure 10C:
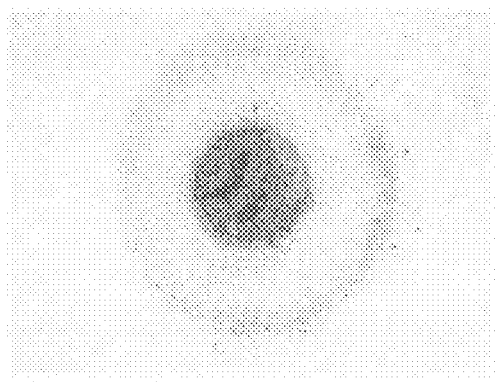
FIG. 10C is an observed image showing an example of a negative electrode-side surface of the separator after a preliminary charge according to the embodiment.
Figure 10D:
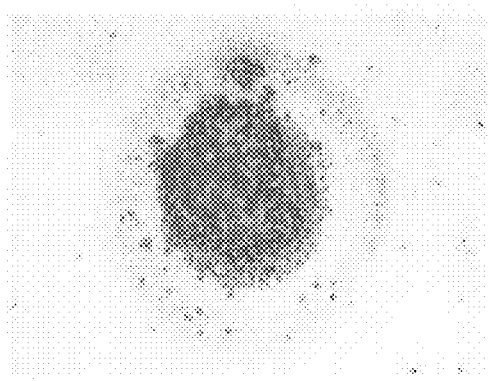
FIG. 10D is an observed image showing an example of a negative electrode surface after a preliminary charge according to the embodiment.

Each cell was taken apart after the preliminary charge and surfaces of the positive electrode sheet and the negative electrode sheet were observed through an optical microscope. Moreover, FIG. 8 is an observed image of a copper particle as the metallic foreign substance adhered onto the positive electrode, and FIGS. 9A to 9D and FIGS. 10A to 10D are respectively observed images of Sample 1 and Sample 2 in which A shows a surface of the positive electrode, B shows a surface of the negative electrode, C shows a surface of the separator on the positive electrode side, and D shows a surface of the separator on the negative electrode side. As shown in FIG. 7, with Sample 1 in which the micro charge was only performed once, it was confirmed that the positive electrode potential drops below 3.2 V around 25 minutes after the micro charge. In addition, it was confirmed that most of the copper particles remained undissolved on the surface of the positive electrode after the micro charge as shown in FIG. 9A and there were no visible depositions on the separator and the negative electrode as shown in FIGS. 9B to 9D. On the other hand, with the Sample 2 subjected to the preliminary charge according to the manufacturing method disclosed herein, as shown in FIG. 10A, it was confirmed that almost all of the copper particles on the surface of the positive electrode have been dissolved and there were no undissolved copper particles. In addition, as is obvious from FIGS. 10B to 10D, it was confirmed that copper was gradually diffused and deposited as the copper proceeded to the positive electrode side of the separator, the negative electrode side of the separator, and the surface of the negative electrode. It was also confirmed that a growth of the deposit stops midway in the separator and no growth of the deposit which may cause a short-circuit was observed.

With the lithium secondary battery that is obtained by the manufacturing method disclosed herein, battery performance is not affected by mixing of a foreign substance and, as a result, a highly-reliable lithium secondary battery is realized at lower cost.

While the present invention has been described in its preferred embodiment, it is to be understood that the present invention is not limited to such descriptions and that various modifications can obviously be made.

INDUSTRIAL APPLICABILITY

According to the techniques disclosed herein, a method of manufacturing a lithium secondary battery is provided which does not affect battery performance even if mixing of a metallic foreign substance occurs. According to this manufacturing method, a highly-reliable lithium secondary battery can be realized at lower cost. Therefore, as shown in FIG. 6, according to the present invention, the vehicle 50 (typically, an automobile, and more particularly an automobile comprising an electric motor such as a hybrid automobile and an electric automobile) comprising the lithium secondary battery 1 (which may take the form of an assembled battery in which a plurality of the batteries 1 are connected in series) as a power source can be provided.

REFERENCE SIGNS LIST 1 lithium-ion battery
5 positive electrode body
10 positive electrode
11 positive electrode collector
11A exposed portion
12 positive electrode active material layer
14 positive electrode terminal
15 battery case
16 negative electrode terminal
20 negative electrode
21 negative electrode collector
21A exposed portion
22 negative electrode active material layer
30 separator
50 vehicle

The invention claimed is:

1. A method for manufacturing a lithium secondary battery comprising a positive electrode including a positive electrode active material made of a lithium-containing complex oxide, a negative electrode including a negative electrode active material capable of storing and releasing lithium ions, and a nonaqueous electrolyte, the method comprising:

a step of assembling a cell that includes the positive electrode, the negative electrode, and the nonaqueous electrolyte;

a micro charging step of performing a micro charge on the assembled cell at an amount of charge that is less than 0.01% of a capacity of the cell before performing an initial conditioning charge so that a positive electrode potential with respect to a metal lithium (Li) reference electrode exceeds an Me dissolution potential set in advance at which a mixing-anticipated metal species (Me) starts to dissolve; and an Me dissolution potential holding step of holding the positive electrode potential of the cell at or above the Me dissolution potential for a prescribed period of time after the micro charge, wherein in the Me dissolution potential holding step, dropping the positive electrode potential by self-discharge, and performing the micro charge before the positive electrode potential drops below the Me dissolution potential are performed in combination one or more times.

2. The manufacturing method according to claim 1, wherein the micro charge is repeated for each period set on the basis of a drop rate of the positive electrode potential measured in advance.

3. The manufacturing method according to claim 1, wherein the micro charge is performed using a pulse current so that a charge time is 2 seconds or less.

4. The manufacturing method according to claim 3, wherein a current of 1 C or more is supplied.

5. The manufacturing method according to claim 1, wherein in the Me dissolution potential holding step, a connection with an external power supply is disconnected after the micro charge and the cell is allowed to stand in order to hold the positive electrode potential of the cell at or above the Me dissolution potential.

6. The manufacturing method according to claim 1, further comprising performing a micro discharge after the micro charge.

7. The manufacturing method according to claim 6, wherein the micro discharge is performed by setting a discharge capacity smaller than the amount of charge that is charged by the micro charge.

8. The manufacturing method according to claim 6, wherein the micro discharge is performed using a pulse current of 0.5 C or more.

9. The manufacturing method according to claim 1, wherein copper (Cu) is set as the mixing-anticipated metal species (Me), and
    the micro charge is performed so that the positive electrode potential with respect to the metal lithium (Li) reference electrode exceeds a Cu dissolution potential at which Cu starts to dissolve.

10. The manufacturing method according to claim 1, wherein the positive electrode active material is made of a lithium-containing complex oxide including at least manganese, cobalt, and nickel, and
    a content ratio of the nickel among transition metals constituting the lithium-containing complex oxide is less than 50 mole %.

11. A lithium secondary battery manufactured by the manufacturing method according to claim 1.

12. A vehicle comprising the lithium secondary battery according to claim 11.

* * * * *